W. T. WERTMAN.
HARROW.
APPLICATION FILED OCT 15, 1920.
1,424,966.
Patented Aug. 8, 1922.
2 SHEETS—SHEET 1.
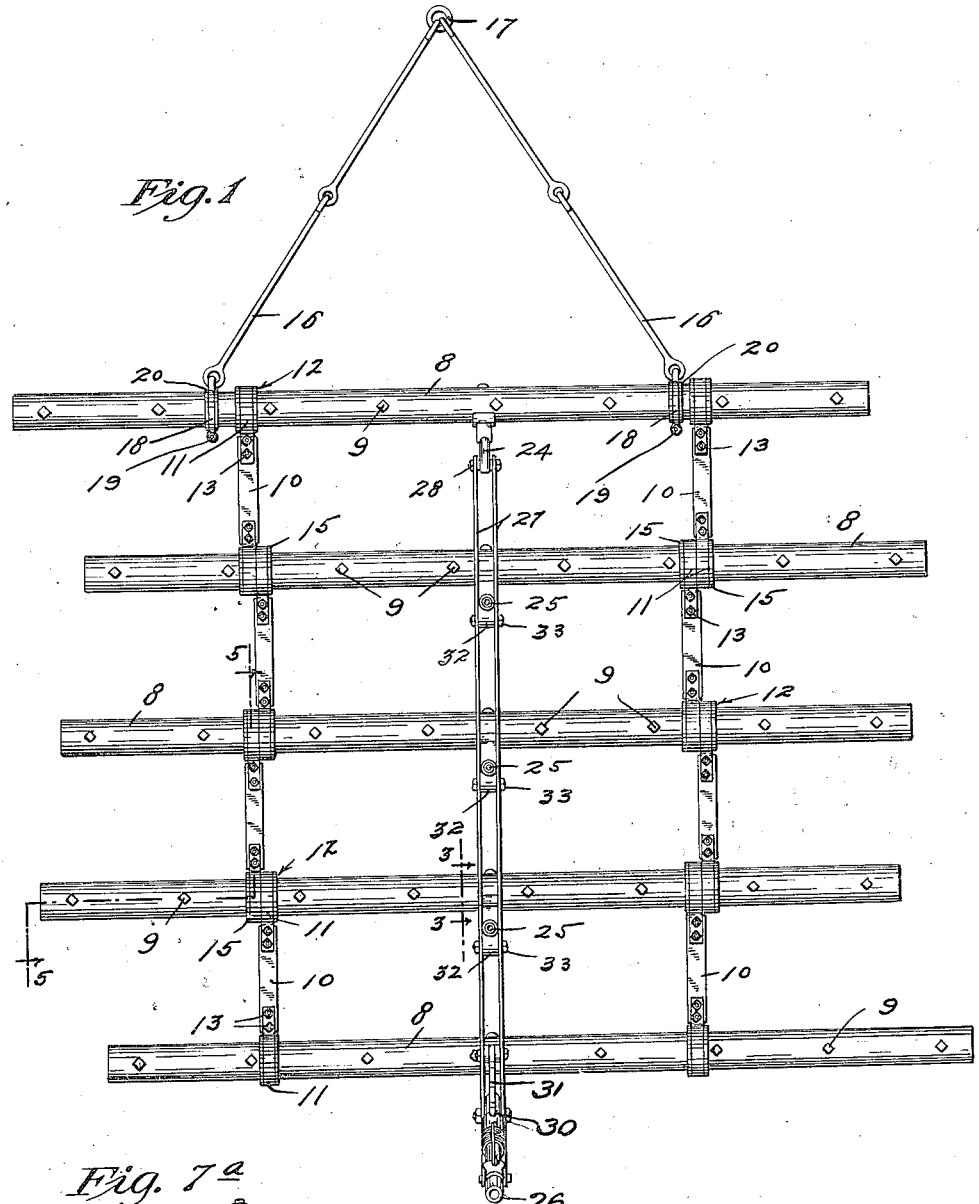
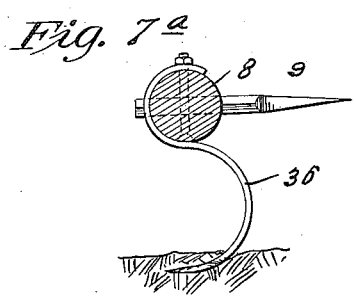
Inventor
William T. Wertman
By his Attorney
Harry D. Kilgore

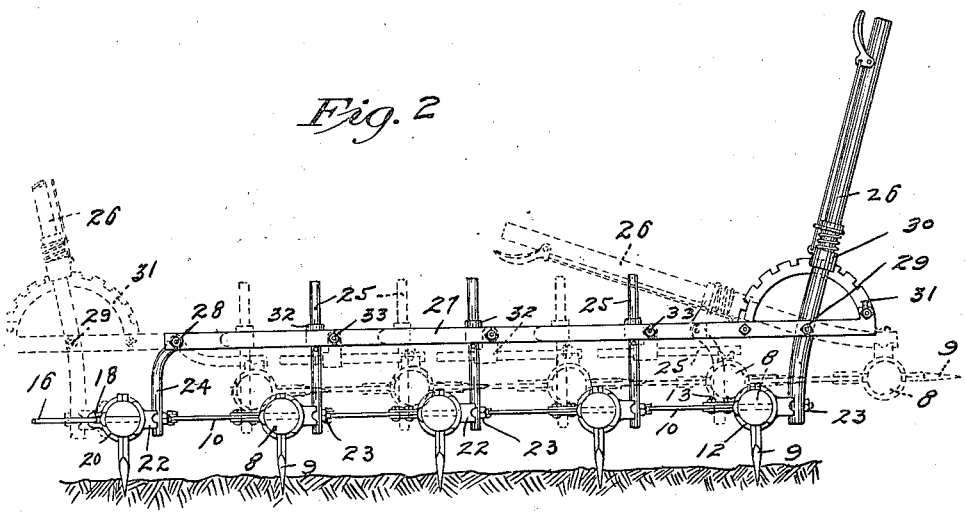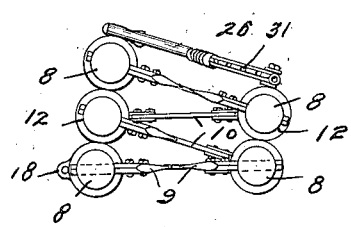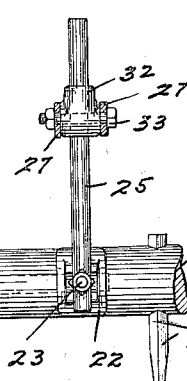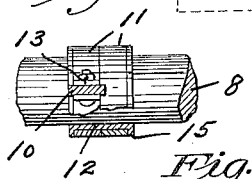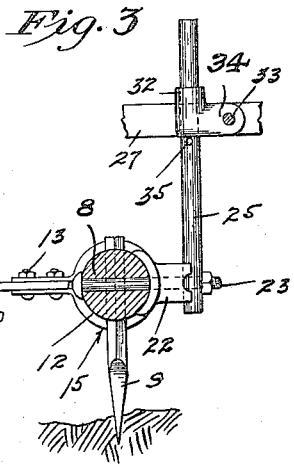

UNITED STATES PATENT OFFICE.

WILLIAM T. WERTMAN, OF MINNEAPOLIS, MINNESOTA.

HARROW.

1,424,966.  Specification of Letters Patent.  Patented Aug. 8, 1922.

Application filed October 15, 1920. Serial No. 417,164.

*To all whom it may concern:*

Be it known that I, WILLIAM T. WERTMAN, a citizen of the United States, residing at Minneapolis, in the county of Hennepin and State of Minnesota, have invented certain new and useful Improvements in Harrows; and I do hereby declare the following to be a full, clear, and exact description of the invention, such as will enable others skilled in the art to which it appertains to make and use the same.

My invention has for its object to provide an extremely simple and highly efficient flexible harrow that will readily adjust itself over uneven ground, that may be reversed to expose different faces of its teeth to wear and that can be folded into very compact form.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the improved harrow;

Fig. 2 is a view in side elevation, with some parts shown in different positions by means of broken lines;

Fig. 3 is a fragmentary detail view with some parts sectioned on the line 3—3 of Fig. 1 and on an enlarged scale;

Fig. 4 is a rear elevation of the parts shown in Fig. 3, with some parts shown in different positions by means of broken lines;

Fig. 5 is a view partly in elevation and partly in vertical section taken on the irregular line 5—5 of Fig. 1;

Fig. 6 is a fragmentary detail view with some parts sectioned on the line 6—6 of Fig. 5;

Fig. 7 is a side elevation of the harrow showing the same folded; and

Fig. 7ᵃ is a detail view showing a modified arrangement of harrow teeth.

The improved harrow includes a plurality of transversely extended forwardly and rearwardly spaced bars 8 having secured thereto harrow teeth 9. Preferably, each bar 8, and the arrangement of its teeth 9, is identical the one with the other and the teeth of the several bars 8 are set in staggered arrangement, by endwise offsetting said bars in respect to each other.

Adjacent bars 8 are flexibly connected with freedom for independent rising and lowering movement, by pairs of laterally spaced links 10 having at their ends collars 11, which encircle bearing sleeves 12 on the bars 8. The collars 11 are transversely split and the ends thereof bent radially outward to receive therebetween the ends of the links 10, which are rigidly secured thereto by pairs of nut-equipped bolts 13. The bearing sleeves 12 are secured to the bars 8 by screws 14 and the collars 11 are held on the bearing sleeves 12, with freedom for turning movement thereon, by annular retaining flanges 15 on the ends of said sleeves. It will be noted that the intermediate bars 8 are of sufficient width to receive, between their retaining flanges 15, two of the collars 11, while the bearing sleeves 12, on the front and rear bars 8, are of such width as to receive, between their retaining flanges 15, one of the collars 11.

For connecting the harrow to a draft equalizer, tractor hitch or the like, there are secured to the front bar 8, forwardly converging links 16 connected, at their outer ends, by a ring 17. The rear ends of the links 16 are flexibly connected to the front bar 8 by transversely split collars 18, to which they are secured by interlocking eyes. The split ends of the collars 18 are bent radially outward and connected by nut-equipped bolts 19. The collars 18 are turnably mounted between annular flanges on bearing sleeves 20 encircling the front bar 8 and secured thereto against endwise movement by screws or other fastening means.

The following connections are provided for imparting simultaneous rocking movement of the bars 8 for moving the teeth 9 to and from operative positions and for locking the same where set:

Aligned crank-acting arms are rigidly secured to the intermediate portions of the bars 8 by horizontally disposed and rearwardly extended coupling blocks 22 and nut-equipped bolts 23. The coupling blocks 22 and nut-equipped bolts 23 are provided for securing the lower ends of a crank arm 24 to the front bar 8, crank arms 25 to the intermediate bars 8 and an operating lever 26 to the rear bar 8. This lever 26 is formed by extending the rear crank arm. Said crank arms 24 and 25 and levers 26 are secured, by the coupling blocks 22, to the intermediate portions of the bars 8 in aligned arrangement from the front to the rear of the harrow.

A tie-bar 27, comprising a pair of laterally spaced members between which the crank arms 24 and 25 and the lever 26 project, has its front end pivotally connected by a nut-equipped bolt 28 to the upper rearwardly curved end of the crank arm 24 and its rear end portion is pivotally connected by a nut-equipped bolt 29 to the intermediate portion of the operating lever 26. A spring-pressed latch 30, on the operating lever 26, is arranged for co-operation with a lock segment 31 secured to the bar 27. The crank arms 25 are connected to the bar 27 by collars 32 mounted thereon, and nut-equipped bolts 33, which extend through aligned bores in the bar 27 and radial rearwardly extended lugs 34 on said sleeves. Transverse pins 35, in the crank arms 25, support the collars 32 on said crank arms 25.

When the operating lever 26 is adjusted, as shown by full lines in Fig. 2, the bars 8 are held with the teeth in true vertical positions. A rearward movement of the operating lever 26 will rock the bars 8 and thereby throw the points of the teeth 9 forward. A forward movement of the lever 26 will rock the bars 8 and thereby throw the points of the teeth 9 rearward. A complete forward movement of the operating lever 26, as shown by dotted lines in Fig. 2, positions the bars 8 so that all the teeth 9 extend in a horizontal plane. With the teeth 9 thus adjusted into inoperative position, the bars 8 will rest directly on the ground, or if the surface of the ground or road is hard, the harrow will be supported by the collars 11 and flanges 15.

In case the harrow teeth 9 become badly worn on their front faces, their other or rear faces may be exposed to wear by removing the bolts 23 from the bars 8 and all of the parts carried by the bar 27 reversed, as indicated by broken lines in Fig. 2, and again secured to the bar 8 by the bolts 23. The draft connections 16, 17, 18 and 20 must also be removed from the front bar 8 and secured to the rear bar 8.

To ship or store the harrow, the same may be folded into very compact form, as shown in Fig. 7. To thus fold the harrow, it is only necessary to remove the bolts 28 and 29 from the bar 27 to permit said bar, and the parts secured thereto, to be removed from the harrow by lifting the collars 32 from the crank arms 25. The crank arms 25 may then be turned into parallel arrangement with the bars 8 by loosening the bolts 23 sufficiently to release said crank arms from the vertical grooves in the coupling blocks 22 and permit the same to be turned into the horizontal grooves in said blocks and then rigidly secured by again tightening said bolts. The bars 8 may then be rotated in the collars 11 to bring the teeth 9 between said bars and then alternately folded, the one upon the other, as shown in Fig. 7. While only a single harrow section is shown in the drawings, it is, of course, understood that a plurality of these sections may be connected, the one to the other, and to a draft equalizer.

Referring now to the modification shown in Fig. 7ª, there is secured to the bar 8, in addition to the straight tooth 9, a spring harrow tooth 36, which is circumferentially spaced from said straight tooth and located approximately ninety degrees therefrom.

When a harrow section is provided with teeth of different character, as shown in Fig. 7ª, the straight teeth 9 may be held in operative positions when the lever 26 is set as shown by full lines in Fig. 2. A complete forward movement of the lever 26, as indicated by broken lines in Fig. 2, will move the straight teeth rearward into inoperative positions and the spring teeth 36 into operative positions. A complete rearward movement of the lever 26 will move all of the teeth 9 and 36 forward into raised inoperative positions.

When the pins or cotters 35 are removed from the crank arms 25, the harrow will be flexible so that the tooth bars can rise and fall independently and thus adapt themselves to all irregularities in the surface of the ground. When, however, the pins 35 are applied, as illustrated in the drawings, the harrow is made semi-flexible, that is, the said pins or cotters limit the upward movements of the bars, but not the downward movements. This latter arrangement especially adapts the harrow for use where it is desired to level off or smooth up the ground that is being harrowed.

From the foregoing statements, it is evident that this harrow is capable of a wide range of usage and is efficient for the several purposes had in view.

It will, of course, be understood that the elements of the harrow may be made of any suitable material, to wit: either wood or iron, in any desired form, and that the harrow will be made in different sizes and different weights for different kinds of work or for different localities.

What I claim is:

1. A harrow comprising forwardly and rearwardly spaced toothed bars, links flexibly connecting said bars for independent rising and falling movements, a rigid tie bar extended over said toothed bars, crank arms rigidly connected to the front and rear toothed bars and pivotally connected to said tie bar, other crank arms rigidly connected to the intermediate toothed bars and slidably and pivotally connected to said tie bar, a lever pivotally connected to said tie bar and to one of said toothed bars, and means on said tie bar for securing said lever against movement.

2. A harrow comprising a plurality of forwardly and rearwardly spaced toothed bars, links flexibly connecting said toothed bars with freedom for oscillatory movements, a rigid tie bar extended above said toothed bars, crank arms rigidly connected to the front and rear toothed bars and pivotally connected to said tie bar, other crank arms rigidly connected to the intermediate toothed bars and pivotally and slidably connected to said tie bar, a latch lever formed as an extension of one of the end crank arms, and a latch arch rigid on said tie bar and co-operating with said latch lever to hold said toothed bars in different oscillatory adjustments.

3. A harrow comprising forwardly and rearwardly spaced toothed bars, links flexibly connecting said bars for independent rising and falling movements, a rigid tie bar extended over said toothed bars, crank arms rigidly connected to the front and rear toothed bars and pivotally connected to said tie bar, other crank arms rigidly connected to the intermediate toothed bars and slidably and pivotally connected to said tie bar, a lever pivotally connected to said tie bar and to one of said toothed bars, means on said tie bar for securing said lever against movement, and means whereby, at will, said intermediate crank arms may be secured against vertical sliding movements in respect to said tie bar, thereby rendering the harrow a substantially rigid structure.

4. A harrow comprising forwardly and rearwardly spaced tooth-equipped bars, crank arms, coupling blocks securing the crank arms to the bars either substantially at right angles thereto or substantially parallel thereto, a tie-bar to which the crank arms are pivotally connected, and means for operating the tie-bar.

In testimony whereof I affix my signature.

WILLIAM T. WERTMAN.